United States Patent

Takabayashi

4,235,509
, 25, 1980

[54] ELECTRICALLY DRIVEN O_ INSTRUMENT WITH MANUAL DRIVE

[75] Inventor: Yutaka Takabayashi, Hachioji, Japan

[73] Assignee: Olympus Optical Co., Ltd., Tokyo, Japan

[21] Appl. No.: 15,892

[22] Filed: Feb. 28, 1979

[30] Foreign Application Priority Data

May 12, 1978 [JP] Japan .................................. 53-63625

[51] Int. Cl.³ .............................................. G02B 7/08
[52] U.S. Cl. ........................................ 350/44; 350/76; 350/77; 350/187
[58] Field of Search ...................... 350/40, 41, 42, 43, 350/44, 46, 45, 74, 75, 76, 77, 187; 74/625

[56] References Cited

U.S. PATENT DOCUMENTS

| | | | |
|---|---|---|---|
| 3,224,351 | 12/1965 | Strasser | 350/76 |
| 3,350,977 | 11/1967 | Gaus et al. | 350/46 |
| 3,834,796 | 9/1974 | Komine | 350/187 |

*Primary Examiner*—John K. Corbin
*Assistant Examiner*—Matthew W. Koren
*Attorney, Agent, or Firm*—Weinstein & Sutton

[57] ABSTRACT

An electrically driven optical instrument such as stereomicroscope is provided with a transfer shaft rotatably carrying a drive transmitting, transfer gear. An axial displacement of the transfer gear occurs in response to an external operation to move the transfer gear selectively to a first position in which it meshes with an output gear on a motor and a second position in which it meshes with a manually driven gear that is mounted on an externally exposed operating shaft, thus accomplishing a switching between an electrical drive and a manual drive.

6 Claims, 1 Drawing Figure

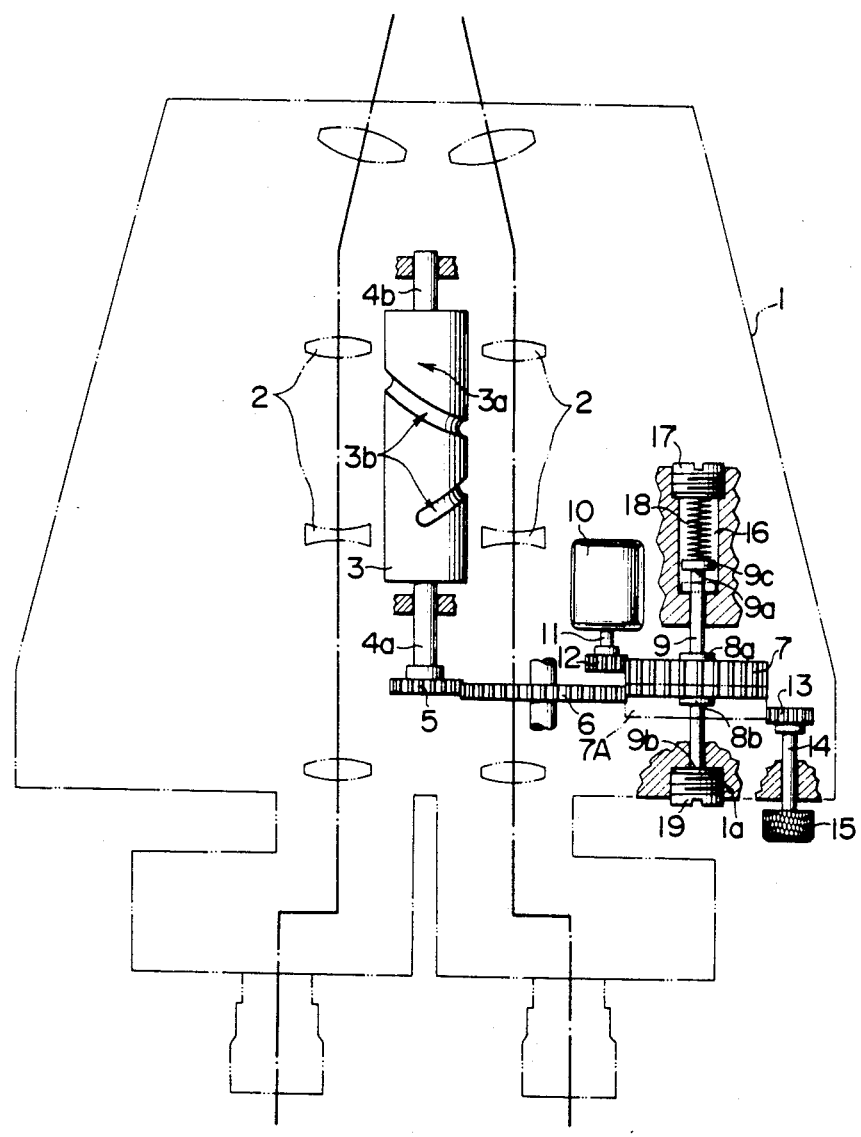

ELECTRICALLY DRIVEN OPTICAL INSTRUMENT WITH MANUAL DRIVE

BACKGROUND OF THE INVENTION

The invention relates to an apparatus for switching between an electrical drive and a manual drive mode of an optical instrument, and more particularly, to an optical instrument such as stereo-microscope which is normally electrically driven but which is also provided with a switching device to permit a manual drive.

An optical instrument, for example, a stereo-microscope, is known which may be electrically driven to change its magnification, and finds applications in surgical operations. A conventional electrically driven zoom stereo-microscope is not provided with a manual drive mechanism, and hence a change of the magnification is inhibited in the event of occurrence of a failure in the electrical drive such as motor. In particular, if the failure of the motor occurs during a surgical operation for which the microscope is used, there has been no accommodation for emergency, resulting in a hazardous risk. Frequently a resort must be had to an expert for the repair of the electrical drive, and it takes a relatively long period of time until the microscope is reusable. In the meantime, there can be made no use of the microscope.

SUMMARY OF THE INVENTION

It is an object of the invention to provide an electrically driven optical instrument with manual drive which avoids above disadvantage of the prior art providing the instrument with switching means which is selectively operable to activate a manual and an electrical drive mode.

In accordance with the invention, a switching between an electrical drive and a manual drive is enabled with a simple arrangement including an axially displaceable transfer shaft on which a drive transmitting, transfer gear is rotatably mounted. The arrangement also includes manual drive means which comprises a manually driven gear which is mounted on an operating shaft exposed to the exterior of the microscope. The simple arrangement presents no difficulty whatsoever in the design and manufacture of the optical instrument.

As a further aspect of the invention, a zooming operation of the electrically driven optical instrument such as stereo-microscope can be performed manually, so that in the event of occurrence of a failure in the electrical drive when the microscope is utilized in a surgical operation, it is unnecessary to wait for a repair of the microscope by an expert, but the transfer shaft can be displaced by a simple operation such as disengaging a set screw to permit an immediate transfer into a manual operation, thus accommodating for an emergency and drastically improving the dependability of the microscope.

BRIEF DESCRIPTION OF THE DRAWING

The single drawing is a schematic plan view, partly in section, of the apparatus according to one embodiment of the invention, as applied to a stereo-microscope.

DESCRIPTION OF THE PREFERRED EMBODIMENT

Referring to the drawing, there is shown an essential part of the apparatus of the invention as applied to a microscope 1 including an optical lens system 2, which is movable in the direction of its optical axis by means of a cam member 3 for purpose of varying the magnification. The cam member 3 comprises a cylindrical cam having a peripheral surface 3a in which a cam groove 3b is formed. The cam member has a pair of support stub shafts 4a, 4b which are rotatably mounted in a stationary part of the microscope 1. A drive gear 5 is fixedly mounted on the end of the shaft 4a and meshes with an intermediate gear 6, which in turn meshes with a drive transmitting, transfer gear 7.

The transfer gear 7 is rotatably mounted on a transfer shaft 9, and is locked thereon by O-rings 8a, 8b or E-rings. The transfer shaft 7 is axially displaceable, and in its inner position, the transfer gear meshes with an output gear 12 which is fixedly mounted on the output shaft 11 of a reversible motor 10. In the outer position of the transfer shaft 9, transfer gear is adapted to engage with a manually driven gear 13.

The manual gear 13 is fixedly mounted on the inner end of an operating shaft 14 which is rotatably mounted in a stationary member of the microscope 1, and meshes with the transfer gear 7 when it is displaced to its phantom line position 7A as the transfer shaft 9 is axially displaced outward. An operating knob 15 is fixed on the outer end of the operating shaft 14 which is exposed externally of the microscope. By manually rotating the knob, the transfer gear 7 can be rotatively driven.

The transfer shaft 9 has its opposite ends slidably disposed within a stationary member of the microscope 1. The inner end 9a extends into an opening 16 formed within the body of the microscope 1. The inner end 9a is formed with a flange 9c in order to limit the axially outward displacement of the transfer shaft 9. A coiled compression spring 18 is received within the opening 16 and held therein by a set screw 17 which is threadably engaged with the upper end of the opening. The lower end of the spring 18 bears against the flange 9c. Thus, the transfer shaft 9 is urged by the spring to move axially outward. However, the resulting movment is normally blocked by the abutment of the outer end 9b thereof against a set screw 19. In the position shown of the transfer shaft 9, the drive transmitting, transfer gear 7 is disengaged from the manual gear 13, but meshes with both the output gear 12 and the intermediate gear 6, thus transmitting the rotational drive from the motor 10 to the cam member 3.

The set screw 19 is detachably and threadably engaged with a threaded bore 1a formed in the stationary member of the microscope at a position corresponding to the outer end 9b of the transfer shaft 9. When the set screw 19 is removed, the bias applied by the spring 18 causes the transfer shaft 9 to be displaced axially outward, thus disengaging the transfer gear 7 from the output gear 12 and bringing it into meshing engagement with the manual gear 13.

In operation, when it is desired to utilize the electrical drive to achieve a zooming operation of the microscope, the set screw 19 is engaged with the bore 1a in the microscope 1 and the motor 10 energized. When the set screw 19 is threadedly engaged with the bore 1a, the transfer shaft 9 is driven inward into the microscope 1 against the resilience of the coiled spring 18, accomplishing a meshing engagement between the transfer gear 7 and the output gear 12. Thus, the energization of the reversible motor 10 transmits its drive through output gear 12, transfer gear 7, intermediate gear 6 and drive gear 5 to the cam member 3, and the rotation of the cam member achieves a movement of the lens system 2 in the direction of the optical axis to change the magnification by means of the cam groove 3b which is coupled with the lens system in a suitable manner. An operation of the knob 15 remains without effect since the manual gear 13 does not mesh with the transfer gear 7.

In the event of a failure of the electrical drive, or when it is desired to change the magnification through a manual operation, the set screw 19 may be dismounted or removed from the bore 1a and the knob 15 turned. As the set screw 19 is removed, the spring 18 causes the transfer shaft 9 to be displaced axially outward until the transfer gear 7 meshes with the manual gear 13 in its phantom line position 7A. Consequently, a manual rotation of the knob 15 is transmitted through manual gear 13, transfer gear 7, intermediate gear 6 and drive gear 5 to the cam member 3, achieving a desired change in the magnification of the lens system 2 in the similar manner as before.

In the above embodiment, the set screw 19 has been described as being removably engaged with the bore 1a. With this arrangement, the set screw 19 may be lost when it is removed. To avoid this, it may be integrally connected with the transfer shaft 9 or it may be constructed such that it may be loosened to a given extent from the threaded bore 1a without being completely removed therefrom in order to achieve an axial displacement of the transfer shaft 9.

It should be understood that while the embodiment has been described as applied to an electrically driven microscope, the invention is applicable to any optical instrument including an optical lens system which is moved in response to an electrical drive. The switching between the electrical drive and the manual drive is not limited to a sliding movement of the transfer shaft, but may be attained by any other suitable means. Similarly, manual operating means is not limited to a knob, which may be replaced by any other suitable means.

What is claimed is:

1. An electrically driven optical instrument with manual drive comprising a cam member for causing a movement of an optical lens for the purpose of changing its magnification or the like, a transfer shaft which is axially displaceable in response to an external operation, a drive transmitting, transfer gear rotatably mounted on the transfer shaft for transmitting a drive to the cam member, a reversible motor including an output gear which is normally in meshing engagement with the transfer gear for automatically driving the cam member, a manually driven gear mounted on an operating shaft which is exposed externally of the optical instrument, and means for causing a displacement of the transfer shaft between a first position in which the transfer gear meshes with the output gear and a second position in which it meshes with the manually driven gear.

2. An optical instrument according to claim 1 in which said means for causing a displacement of the transfer shaft comprises a coiled compression spring engaging one end of the transfer shaft and urging it to be axially displaced to the second position in which the transfer gear meshes with the manual driven gear, and a set screw engaging the other end of the transfer shaft and counteracting the spring to hold the transfer shaft in the first position in which the transfer gear meshes with the output gear.

3. An optical instrument according to claim 2 in which the set screw is detachably threadably engaged with a stationary member of the instrument, the first position of the transfer shaft being attained when the set screw is threadably engaged.

4. An optical instrument according to claim 2 in which the set screw is integrally connected with the outer end of the transfer shaft and is threadably engaged with a stationary member of the instrument.

5. An optical instrument according to claim 2 in which the set screw is threadably engaged with the stationary member of the instrument so as to be axially movable, an axial movement of the set screw permitting a corresponding axial displacement of the transfer shaft.

6. An optical instrument according to claim 1 in which the manually driven gear is fixedly mounted on the inner end of an operating shaft which is rotatably mounted in a stationary member of the instrument, the operating shaft having an outer end which is exposed externally of the instrument and carrying a manually operable knob thereon.

* * * * *

UNITED STATES PATENT AND TRADEMARK OFFICE
CERTIFICATE OF CORRECTION

PATENT NO. : 4,235,509
DATED : November 25, 1980
INVENTOR(S) : Yutaka Takabayashi It is certified that error appears in the above—identified patent and that said Letters Patent is hereby corrected as shown below:

Column 2, line 61, change "threadedly" to --threadably--.

Signed and Sealed this

Seventeenth Day of March 1981

[SEAL]

Attest:

RENE D. TEGTMEYER

*Attesting Officer*     *Acting Commissioner of Patents and Trademarks*